US005526325A

United States Patent [19]

Sullivan et al.

[11] Patent Number: 5,526,325

[45] Date of Patent: Jun. 11, 1996

[54] STEERABLE BEAMFORMER

[75] Inventors: Michael J. Sullivan, Oakdale; Raymond E. D'Addio, Branford; Arthur L. Moorcroft, Oakdale, all of Conn.

[73] Assignee: The United States of America as represented by the Secretary of the Navy, Washington, D.C.

[21] Appl. No.: 530,399

[22] Filed: Sep. 21, 1995

[51] Int. Cl.[6] .................... G01S 15/00

[52] U.S. Cl. .................... 367/138; 367/103

[58] Field of Search .................... 367/103, 119, 367/137, 138; 128/661.01

[56] References Cited

U.S. PATENT DOCUMENTS

| | | | |
|---|---|---|---|
| 3,324,452 | 6/1967 | Brightman et al. | 367/138 |
| 3,346,837 | 10/1967 | Pommerening | 367/138 |
| 3,824,531 | 7/1974 | Walsh | 367/103 |
| 4,045,800 | 8/1977 | Tang et al. | 367/138 |
| 4,173,007 | 10/1979 | McKeighen et al. | 367/11 |
| 4,332,018 | 5/1982 | Sternberg et al. | 367/103 |
| 4,460,987 | 7/1984 | Stokes et al. | 367/103 |
| 4,604,697 | 8/1986 | Luthra et al. | 128/661.01 |
| 4,920,521 | 4/1990 | Yoshie | 367/103 |
| 4,937,767 | 6/1990 | Reuschel et al. | 367/138 |

*Primary Examiner*—Ian J. Lobo
*Attorney, Agent, or Firm*—Michael J. McGowan; Prithvi C. Lall; Michael F. Oglo

[57] ABSTRACT

A transmitter for generating a steerable, variable frequency signal from an array of projectors. An analog signal to be transmitted is sampled, digitized and stored in a circulating memory. A delay storage circuit includes time delays for each projector for each of predetermined beam directions. The successive locations in the recirculating memory correspond to signals having a time correspondence at predetermined unit delays from the signal then at the input terminal. The delay storage unit then produces a reading address for recovering, for each of the projector drivers, a signal value corresponding to an appropriate delay for obtaining the desired steering angle with a constant beamwidth signal. Frequency sensing circuitry can further compensate the signals by assigning each to a frequency bin and utilizing that bin to further define the delay for each projector and control the amplitude of the signal being sent to each projector. The output from a linear array of transducers is steerable over the entire range and operates with a constant band width even with significant frequency variations.

24 Claims, 5 Drawing Sheets

STEERABLE BEAMFORMER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to phased array transmitters and more particularly to phased array transmitters adapted for forming steerable lobes over a wide range of operating parameters.

(2) Description of the Prior Art

Early methods for producing a steerable acoustic beam included the formation of an array of acoustic projectors powered by a single source to form a broadside beam. Steering was accomplished by rotating the entire array. These arrays tended to operate effectively only over a very narrow frequency band and were characterized by complex mechanical rotating mechanisms.

The following patents disclose arrays for producing steerable beams without requiring rotation of the array:

| | |
|---|---|
| 3,324,452 (1967) | Brightman et al. |
| 4,045,800 (1977) | Tang et al. |
| 4,460,987 (1984) | Stokes et al. |
| 4,920,521 (1990) | Yoshie et al. |

The Brightman et al. patent discloses a digital phase control system that uses fixed analog or digital delays in series between a common signal source and each individual transmitter in an array for providing a steering function. The array produces a directional beam because wave energy transmitted by each of the transducers algebraically adds and reinforces the other waves in a certain direction. This direction depends solely upon the positions of the transducer in the array and the relative phase differences existing between signals applied to the adjacent transducers. In all other directions, the wave energies transmitted from each of the respective transducers of the array combine algebraically to cancel each other.

The Tang et al. patent discloses a phase steered subarray antenna adapted for providing electronic scanning while maintaining fairly low sidelobes with respect to a main lobe. Phase steering of subarrays is performed in discrete steps by means of one- or two-bit phase shifters interspersed within the feed network. The phase state of the subarray phase shifters is selected to improve the antenna gain and suppress the other lobes. Overlapping the radiating elements of the subarrays is employed to further suppress grating lobes throughout the limited scan range further.

The Stokes et al. patent discloses a variable focus sonar with a curved array. This steering of the resulting beam from the curved array is accomplished by adjusting the frequency of the transmitted signal.

The Yoshie patent discloses an array using delay time data that is received from a memory location. This time data is interpolated to provide additional information that is summed with the delay time stored in memory to obtain a final signal for transmission to each transducer in the array. This increases the effective number of time delays useful in processing the information while limiting the number of stored data points.

Each of the foregoing references discloses a phased array transmitter or beamformer that is adapted for use at a single frequency or frequency band. The following patents disclose beamformers for producing signals over a wide frequency band:

U.S. Pat. No. 4,332,018 (1982) Sternberg et al.

U.S. Pat. No. 4,591,864 (1986) Sternberg et al.

In the Sternberg et al.-'018 patent an acoustic array employs a mosaic pattern acoustic lens arrangement of fully directional lens antennas as the primary array antenna elements. The lenses at the center of the array pass signals at all frequencies, the lenses near but not at the center pass all signals except those at the highest frequencies and the lenses at the outer periphery pass only those signals with the lowest frequencies. A wide band source can then supply a broad band frequency signal to a plurality of filters, time delays, amplifiers, switches and acoustic retinas for applying predetermined signals to the acoustic lenses. This array provides a constant effective aperture to wavelength ratio independent of frequency for the antenna as a whole and produces a substantially constant beamwidth, frequency independent beam. The time delays, being dependent only on the lens spacing and the scan angle and not on the wavelength, enable scanning independently of frequency.

The Sternberg et al.-'864 patent discloses a frequency independent, constant beamwidth lens antenna that produces a twisted planar or hyperbolic paraboloidal phase or wave front that in turn produces a frequency independent, constant beamwidth beam in the far field of the antenna. The frequency independent, constant beamwidth beam may be steered or scanned in azimuth without moving the lens. Specifically the antenna system includes a cylindrical lens having a longitudinal reference axis parallel to a series of generators of a cylindrical surface of a cylindrical lens and curved cylindrical focal surface. This focal surface has a longitudinal reference axis parallel to the longitudinal reference axis of the lens. A line source conforming with and located on the curved cylindrical focal surface is disposed at a transverse angle with respect to the longitudinal lens reference axis.

The foregoing patents require specially designed lenses. For example the Sternberg et al.-'018 patent requires a series of subarrays that each have special characteristics. Likewise the Sternberg et al.-'864 patent requires specially designed antenna elements in an array. Other patents that disclose the use of delay lines for shifting the signal to different elements of a transmitting array, particularly for use in ultrasonic imaging, include:

| | |
|---|---|
| 4,173,007 (1979) | McKeighen et al. |
| 4,604,697 (1986) | Luthra et al. |
| 4,794,929 (1989) | Maerfeld |

The McKeighen et al. patent discloses a dynamically variable electronic delay line for controlling the phase of signals associated with an array. The time delays assure time synchronism of all transmitted pulses at a remote target.

The Luthra et al. patent also discloses an array of acoustic transducers used for ultrasonic imaging in which the signals from different transducers are delayed. The delays are selected so the presence of a target at a particular point will produce reflected envelopes that additively combine. Signals at other points will not additively combine, but will tend to cancel.

In the Maerfeld patent each part of an antenna is assigned a weighting value that can vary with frequency. The weighting according to frequency is obtained electronically or mechanically. This provides a method of steering any beam from the antenna array. The directivity, however, appears to be dependent upon the frequency of the beam and consequently not frequency independent.

Each of the foregoing references therefore discloses apparatus for controlling the transmission of acoustic energy. Each of the Brightman et al., Tang et al., Stokes et al. and Yoshie et al. patents discloses apparatus that uses fixed or variable time delays to control beam steering. However, this apparatus appears to operate only over a narrow frequency band. The Sternberg et al. patents disclose apparatus for beam steering over wide frequency bands, but this apparatus requires specially constructed antenna or transducer elements. The McKeighen et al. and Luthra et al. patents disclose phase delay circuits for controlling timing or position of a focal point, respectively. Apparatus in the Maerfeld patent provides steering as a function of frequency. None of these references, however, discloses apparatus for transmitting and steering an acoustic beam over a wide frequency band with conventional transducer elements. Consequently, each is limited in a particular application to a single narrow frequency band or to a steerable beam in which the resultant field or beam pattern varies with steering.

SUMMARY OF THE INVENTION

Therefore, it is an object of this invention to provide an array of transmitting elements that allows the steering of a beam therefrom over a wide frequency band.

Another object of this invention is to provide an array of acoustic transducers for providing an electronically steerable acoustic beam over a wide range of acoustic frequencies.

Yet another object of this invention is to provide an array of transmitting elements in which the delay of the signal to each element can be adjusted.

Yet still another object of this invention is to provide an array of transmitting elements in which the amplitude of the signal to each array can be modified.

Still another object of this invention is to provide an array of acoustic transducers for providing an electronically steerable acoustic beam over a wide range of acoustic frequencies whereby the beam pattern remains relatively constant.

A transmitting array constructed in accordance with this invention includes a plurality of individual transducers subject to being driven by a variable frequency analog signal and a beam direction control signal. A timer establishes a sampling interval and a unit delay interval. An analog signal storage device accumulates successive values for the analog control signal during each sampling interval. A frequency range sensor establishes a correspondence between the frequency of the analog control signal and one of a set of frequency ranges during each sampling interval. A delay storage device responds to the beam direction control signal for identifying for each transducer in the array one of the stored values of the analog signal storage device. Drivers respond to the selected value by generating, for each transducer in the array, an analog output signal for each acoustic projector that has a delay determined by the corresponding stored value to control the main beam width and direction and the side lobes.

In accordance with another aspect of this invention, a transmitter for driving an array of individual transducers in response to an analog control signal and beam direction control signal includes a plurality of individual transducers and a timer that establishes a sampling interval. An analog storage device accumulates successive values for the analog control signal during each sampling interval. A frequency range sensor establishes a correspondence between the frequency of the analog control signal and one of a set of frequency ranges during each sampling interval. A delay storage device responds to the beam direction control signal for producing, for each transducer in the array, a time delayed analog control signal for that transducer. A signal amplitude modifying circuit connected to the timer, the analog signal storage device and the delay circuit modify, for each transducer in the array, the amplitude of the time delayed analog signal for that transducer in response to the frequency range that the frequency range sensor provides. Drivers connected to the timer and the signal modifying circuit generate, for each transducer in the array, an analog output signal in response to the transducer driver signal. Each signal for a given acoustic projector has a delay determined by a corresponding time-delayed analog control signal and an amplitude determined by the signal amplitude modifying circuit.

In accordance with still another aspect of this invention, a transmitter for driving an array of individual transducers in response to an analog control signal and beam direction control signal includes a plurality of individual transducers and a timer that establishes a sampling interval. An analog signal storage device accumulates successive values for the analog control signal during each sampling interval. A frequency range sensor establishes a correspondence between the frequency of the analog control signal and one of a set of frequency ranges during each sampling interval. A delay storage device responds to the beam direction control signal for identifying, for each transducer in the array, one of the stored values of the analog signal storage device. Drivers respond to the selected value by generating, for each transducer in the array, an analog output signal having a delay determined by the analog control signal. A signal amplitude modifying circuit modifies the amplitude of the analog output signal in the driver means in response to the determination of the signal from the frequency range sensor. Consequently the signals to the individual elements are controlled in both amplitude and phase to provide beam steering over a wide band of frequencies.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
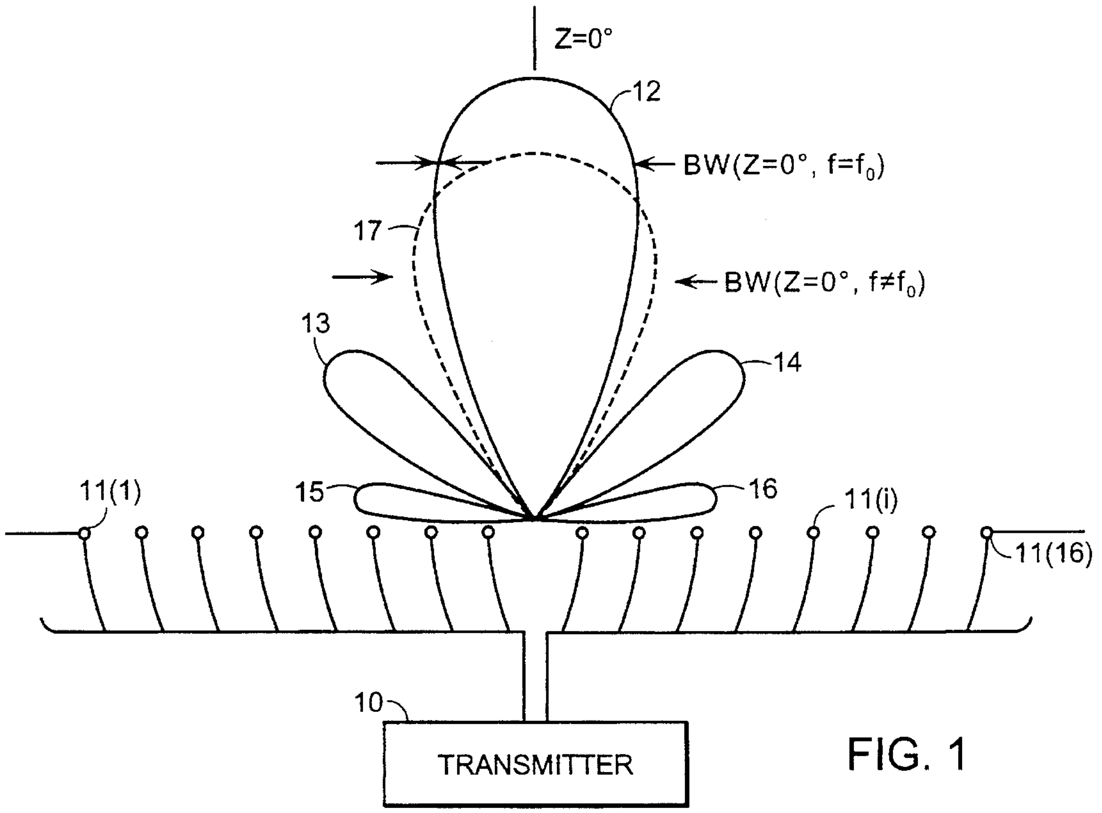
FIG. 1 depicts broadside beam patterns with changing frequency from a prior art linear antenna array.

FIG. 1 depicts beamforming apparatus for transmitting an acoustic energy along a particular azimuth in this example along a 0° azimuth (Z=0°). This apparatus includes a transmitter 10 with circuitry for generating an acoustic signal and dividing that signal into a plurality of delayed outputs for driving individual transducers, or projectors 11 typically arranged in a linear array. The driven projector array 11 includes individual transducers 11(1) . . . 11(i) where a typical array might include sixteen driven projectors (i.e., $1 \leqq i \leqq 16$). The delays are selected for each of the individual projectors 11(i) to produce a primary or main lobe 12 along an azimuth (Z=0°) that extends substantially at a right angle to the array 11. As known, the transmission of the main lobe 12 is accompanied by the generation of various side lobes such as first side lobes 13 and 14 and second side lobes 15 and 16. The resulting acoustic energy distribution including the main lobe 12 characterized by a beam spread or beam width function identified as $BW(Z=0°, f=f_o)$ where $f_o$ corresponds to the resonant frequency of the linear array 11.

FIG. 1 illustrates the effect of changing the frequency in prior art devices in terms of a difference between the beam width 12 at Z=0, $f=f_o$ and at Z=0, $f \neq f_o$. As known, the intensity along the projection axis decreases and the main lobe broadens as the frequency departs from the characteristic or resonant frequency, $f_o$, for the array 11. The dashed lobe 17 depicts this effect for Z=0°, $f \neq f_o$.

Figure 2:
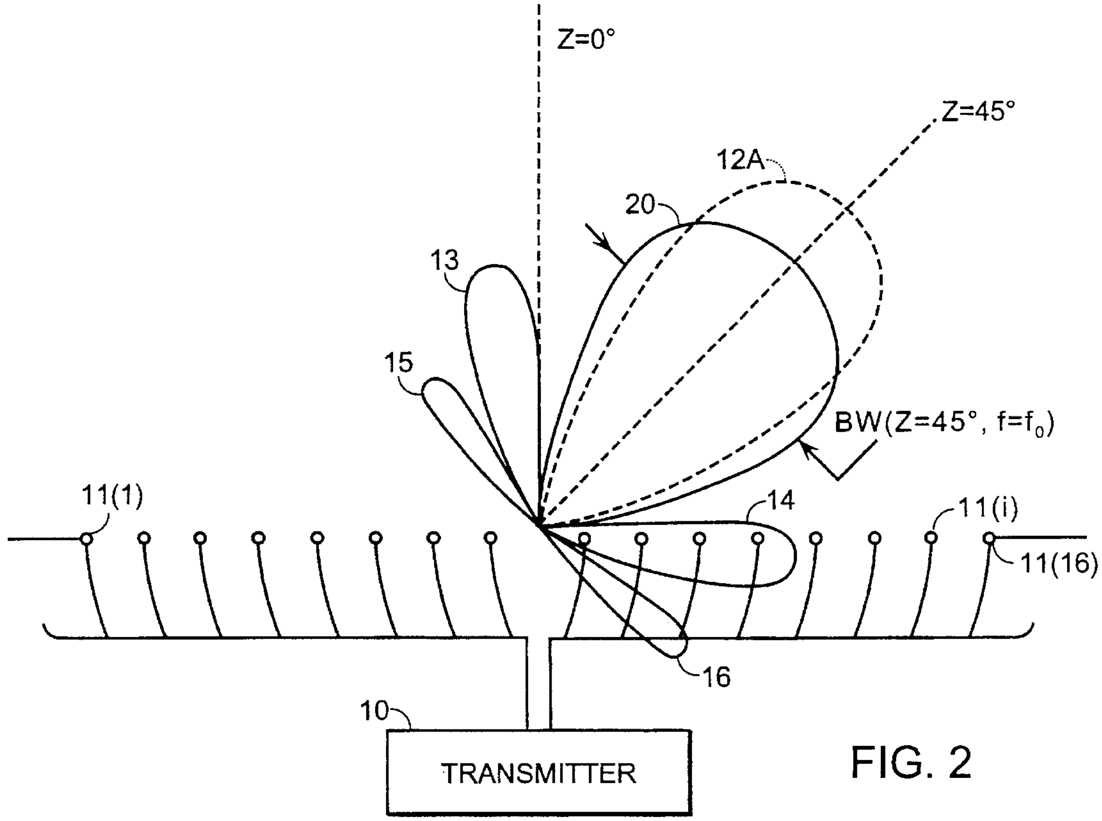
FIG. 2 compares the dependence of broadside beam patterns with steering from a prior art linear antenna array and from a linear antenna array constructed in accordance with this invention.

FIG. 2 discloses the effect of changing the azimuth angle, for example to Z=45°, in prior art systems. The delays to the individual projectors in the array 11 are modified to produce this distribution to angularly offset main lobe 20 having a beam width BW defined by $BW(Z=45°, f=f_o)$. The main lobe 20 is broader than the main lobe 12A that represents the main lobe 12 merely rotated 45°. Thus, as previously indicated, in prior art beam forming apparatus, rotating the beam in azimuth typically causes the main lobe to broaden and to lose intensity along the projection axis.

Figure 3:
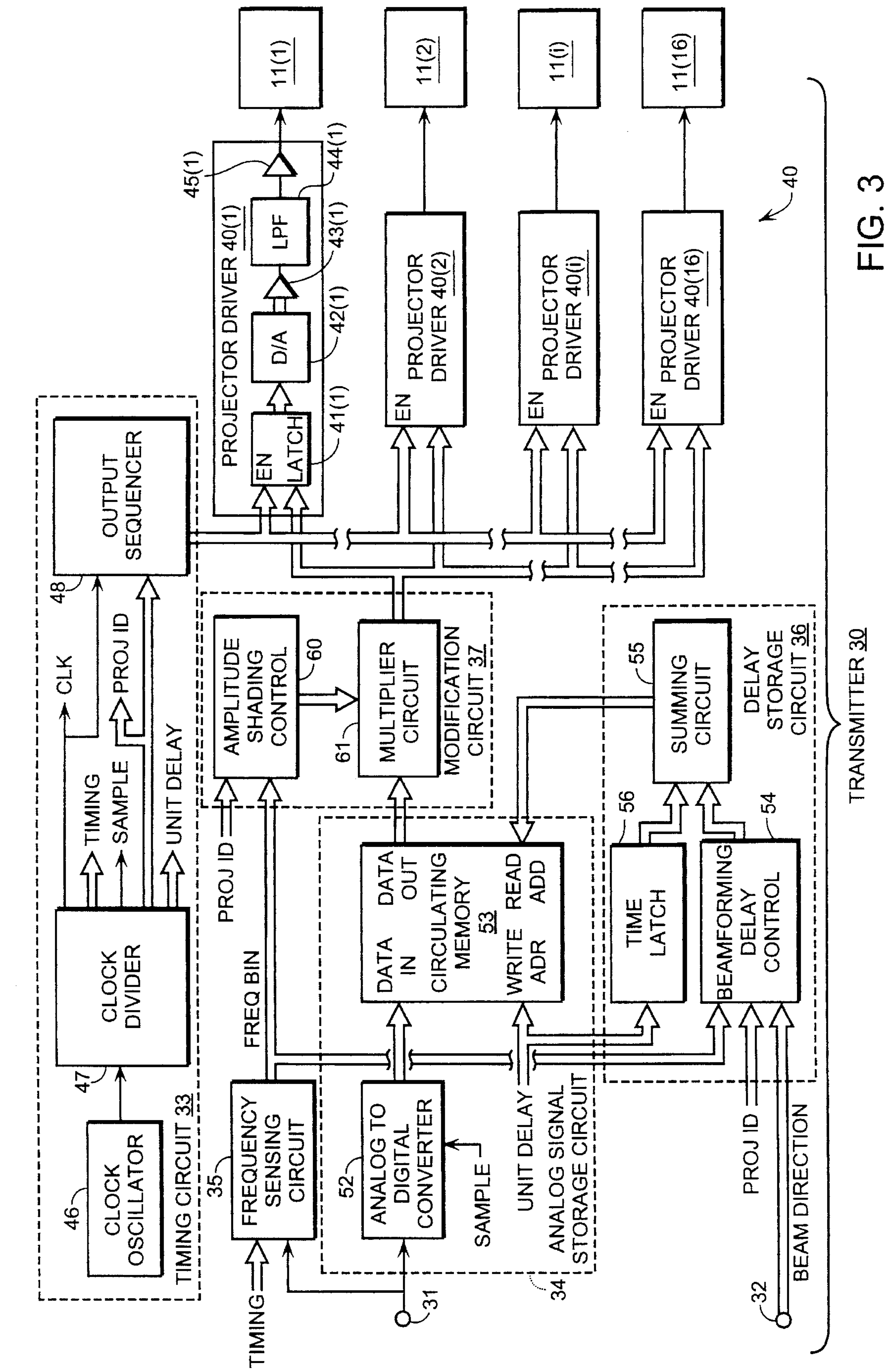
FIG. 3 is a block diagram of circuitry associated with a linear antenna array constructed in accordance with this invention.

Apparatus in FIG. 3 discloses a transmitter 30 constructed in accordance with this invention that drives the array of projectors. In this specific embodiment, like FIGS. 1 and 2, the transmitter 30 drives sixteen projectors with FIG. 3 depicting projectors 11(1), 11(2), 11(i) and 11(16) over a wide range of azimuth (i.e., $-90°<Z<90°$). As known, the physical spacing of the projectors 11 limit the "narrowness" of the beam in a broadside projection (i.e., the main lobe 12 in FIG. 1). In accordance with this invention the beam can be steered away from the broadside reduction without substantially broadening the beam or reducing the intensity of the transmitted energy. Stated differently, the $BW(Z=0°, f=f_o)$ pattern should be of substantially the same as the $BW(-90°<Z<90°, f_{min}<f<f_{max})$ wherein $f_{min}/f_{max} \approx 2:1$. More specifically, the transmitter 30 samples and digitizes an incoming analog signal at terminal 31 at a first sampling rate, processes that signal in response to a beam direction signal at input 32 and energizes the projector array 11. A timing circuit 33 defines fixed sampling intervals and generates synchronizing signals for controlling the relative timing and operation of the remaining circuits in the transmitter 30.

One of the remaining circuits is an analog signal storage circuit 34 that digitizes the incoming analog signal at the input 31 during each sampling interval in response to a SAMPLE signal and stores the successively digitized samples at successive storage locations. Thus each successive storage location for the incoming analog signal represents a delayed value of the current sampled signal with a time delay equaling a multiple of sampling intervals represented by the offset between that location and the location in the analog storage circuit 34 containing the current signal sample.

A frequency sensing circuit 35 responds to the incoming analog signal at the input terminal 31 and to signals from the timing circuit 33. This circuit 35 determines which, if any, of a predetermined set of frequency ranges or bins corresponds to the frequency of the incoming analog signal at the terminal 31.

A delay storage circuit 36 contains one delay value for each value of the beam direction signal at the input 32, for each of the projectors in the projector array 11 and for each frequency range. In one particular embodiment, for example, a BEAM DIRECTION signal selects a particular beam direction, and the frequency sensing circuit 35 categorizes the incoming analog signal into one of a member of frequency ranges or bins represented by a FREQ BIN ID signal. These signals plus PROJ ID signals identify a delay for each projector 11(i) necessary to optimize the performance of the array 11. A delay storage circuit 36 with 32 k predetermined beam delay storage locations (where k=1024) can store information for a system with a sixteen-projector array, 256 possible beam directions and eight possible frequency bins or ranges. Each delay value in the delay storage circuit 36 can be based upon simulation or experience.

The timing circuit 33 provides addresses in the form of UNIT DELAY signals for defining particular locations in the analog signal storage circuit 34. The delay storage circuit 36 also utilizes these signals to obtain an address offset for addressing the delay storage circuit 36. The offset location in the analog signal storage circuit 34 contains, for a particular projector in the 11(i), the address in the signal storage unit 34 that corresponds to an appropriately delayed signal.

The transmitter 30 shown in FIG. 3 includes, in addition to or in lieu of the delay storage circuit 36 a modification circuit 37. The modification circuit 37 compensates the signals from the analog storage circuit 34 in response to the measured frequency range of the incoming signal. Increasing or decreasing the value of an individual digital signal obtained from the analog storage circuit 34 fine tunes the transmitter output.

The signals from the analog signal storage circuit 34 and the signal modifying circuit 37 transfer to the inputs of an array 40 of projector drivers. Each projector driver drives one projector in the array 11. FIG. 3 depicts projector drivers 40(1), 40(2), 40(i) and 40(16). Typically each projector driver, such as projector driver 40(1) includes a latch 41(1), a digital-to-analog converter 42(1), a buffer amplifier 43(1), low pass filter (LPF) 44(1) and a power amplifier 45(1).

In essence the analog signal storage circuit 34 stores a chronology of the past values of the incoming analog signal, albeit in digital form, over some number of sampling intervals. The data in each successive location following the location receiving the most recent samples, constitutes the data after a predetermined delay. The delay storage circuit 36 then generates an offset for selecting the signal having the appropriate delay for each transducer 11(i) to produce a signal specially processed for that particular transducer. The signal modification circuit 37 further compensates for frequency variations in the incoming analog signal. Consequently, as shown in FIG. 2, the resulting net beam 20 from the array is a steerable beam that maintains a substantially constant pattern over a wide range of steering angles and over a significant frequency range.

FIGS. 3 through 6 depict one embodiment of this invention adapted for driving sixteen transducers. It will become apparent, however, that this particular number has been selected for purposes of explanation only and that the transmitter is adapted for arrays having different numbers of transducers. In addition, this embodiment depicts a circuitry controlled by a series of address signals that have inherent timing capabilities. Specific timing details needed to assure proper sequencing of particularly digital data through the circuitry is well known in the art and not necessary for an understanding of this invention and is omitted.

Now referring specifically to FIG. 3, the timing circuit 33 includes a conventional clock oscillator 46, typically a crystal-controlled oscillator, for driving a clock divider 47 that produces a number of addressing and timing signals. Certain of these signals, such as PROJ-ID and CLK signals, transfer to a number of circuits including an output sequencer 48 also located in the timing circuit 33.

Figure 4:
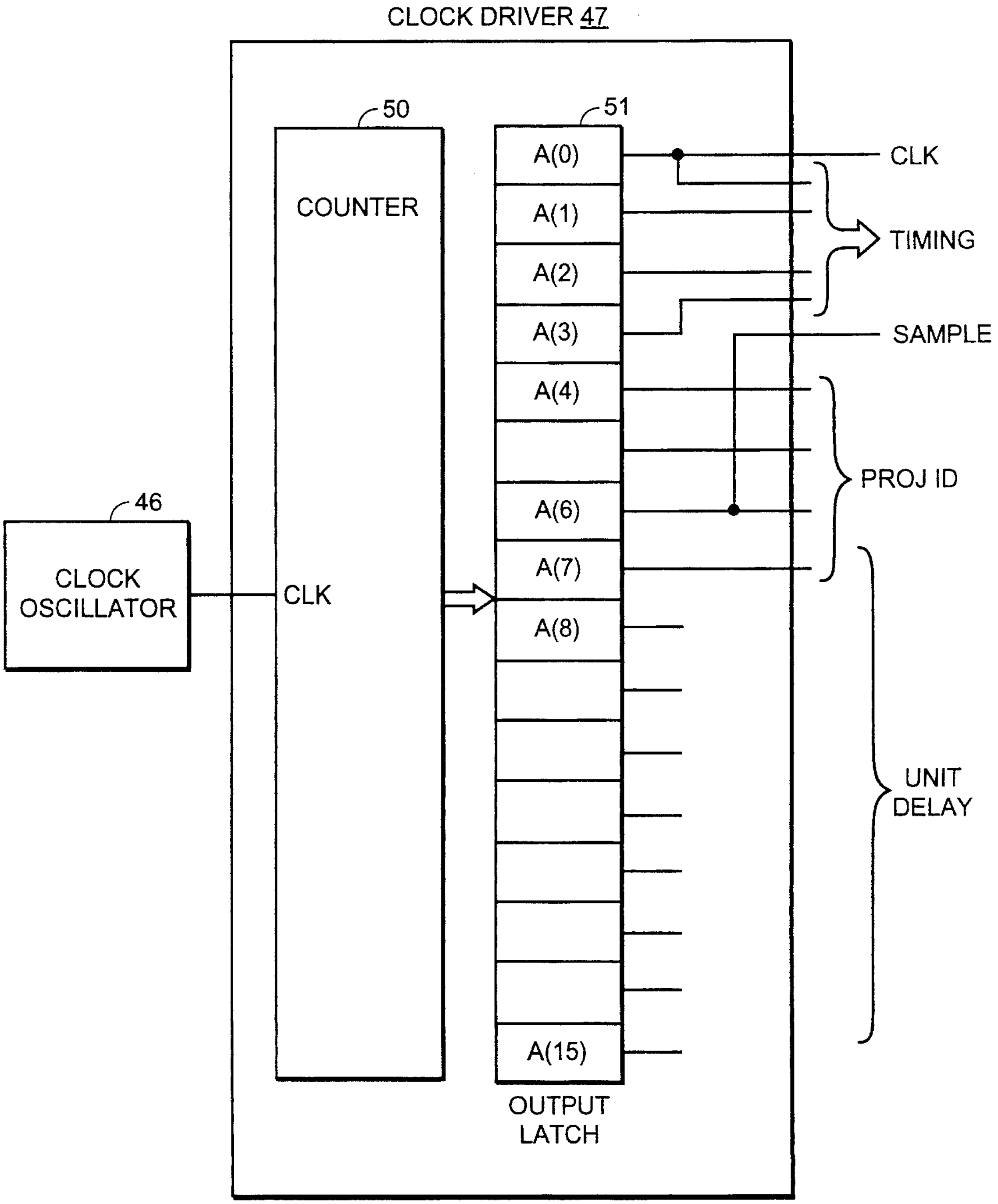
FIG. 4 depicts the details of one embodiment of addressing circuitry useful in the circuitry of FIG. 3.

FIG. 4 schematically depicts one version of a clock divider 47 that is adapted for use with this particular embodiment. More specifically the clock divider 47 shown in FIG. 4 receives the clocking signals from the clock oscillator at a counter 50. The value of the counter may then be used directly or stored in a buffering output latch 51. In this particular embodiment each of the counter 50 and latch 51 contains 16 bits thereby to define 32K (K=1024) states by A(0) through A(15) bit signals. In one particular embodiment, the clock oscillator 46 generates a 3.2768 MHc clocking signal. The output of the A(0) bit position can constitute a CLK pulse. Another bit position produces a SAMPLE signal that controls the timing during which the input signal at terminal 31 is sampled in the analog signal storage circuit 34. The selection of a particular bit position for providing the sampling signal will be determined in response to good sampling theory for the given incoming signal. In this particular embodiment, the A(6) bit position is taken as the sample signal such that the incoming analog signal will be sampled at a 51.2 Khz rate (i.e., approximately every 20 μs.

Also in this particular embodiment bit positions A(4) through A(7) are selected to act as the PROJ ID signals in order to define the sixteen projectors in the array. Therefore the entire array is updated at approximately every 40 μseconds so that the output signal from the projectors is a good representation of the incoming analog signal at terminal 31.

The signals from the A(7) through A(15) bit positions constitute unit delay signals that define a succession of unit delay locations within the analog signal storage circuit 34. The least significant of these bits (i.e., A(7) bit) can constitute a clocking signal.

Referring again to FIG. 3, the analog signal storage circuit 34 includes an analog to digital converter 52 that receives the incoming analog signal at terminal 31 and produces a digital representation of that signal in response to the SAMPLE signal from the clock divider 47. This constitutes an input signal to a DATA IN connection of circulating memory 53. The UNIT DELAY signals also define an address that is applied to the WRITE ADR input of the circulating memory 53 to load the digital representation of the incoming signal into the circulating memory 53 in response to each SAMPLE signal. If the A(8) through A(15) signals identify a location and the A(7) signal constitutes an enabling signal, the circulating memory 53 can store data for 256 unit delays thereby to provide, at any given instant, the value of the incoming analog signal at that instant in the prior 255 unit delays. At a sampling frequency of 51.2 kHz, 255 time delays provide delays up to about 5 milliseconds. Shorter or longer delays can be incorporated by adjusting the size of the circulating memory 53 and the number of data bits in the address.

The delay storage circuit 36 provides a means for accessing the circulating memory 53 to obtain outputs that will drive each of the projectors 11 in the proper phase relationship. The delay storage circuit 36 includes a beamforming delay control 54 that may comprise a programmable read only memory or other equivalent storage device. The beamforming delay control 54 stores a matrix of values defined by the number of a specific projector and the azimuth that is selected by the beam direction signals at input terminal 32. That is, the value at any location represents the number of unit delays with respect to a referenced time by which the corresponding projector should respond to an incoming signal at the input terminal 31. The PROJ ID, the FREQ BIN and the BEAM DIRECTION signals are applied to the beamforming delay control 54 to produce in sequence the corresponding delay values. Each delay value in sequence for each projector then constitutes one input to a summing circuit 55.

The other input to the summing circuit is the value of the unit delay signals provided by a time latch 56. The signals from the time latch represent the address of the current value of the signal, and the signals from the beamforming delay control 54 represent an offset from that value. The summing circuit 55 combines the reference value and offset to provide a read address (i.e., READ ADR signals). The circulating memory 53 retrieves the stored digital data representing the corresponding delay for the signal at the terminal 31 for that projector. The modification circuit 37 couples that output to all the projector drivers 40(1) . . . . At the same time the PROJ ID signals to the output sequencer 48 select one of the corresponding projector drivers 40(i) thereby to load the digital value for that projector, such as by loading the digital value into the enabling latch 41(1). Thus as the clock divider 47 counts through the PROJ ID numbers, each projector driver 40(i) receives, in sequence, a new digital value in its corresponding enabling latch. The timing signals or clock signal may then enable all the latched signals to be applied to the respective digital analog converter simultaneously, such as the digital-analog converter 42(1) in the projector driver 40(1), to update the signal and to energize the corresponding projectors 11 with the appropriately delayed analog signal.

With this circuitry the main lobe 17 shown in FIG. 1, when rotated, maintains essentially the same beamwidth. That is: BW(f,Z)≈k. For example, at an azimuth Z=45° as represented by the solid line lobe 20 in FIG. 2, the beamwidth is the same as the beam width at Z=0° shown in FIG. 1.

Figure 5:
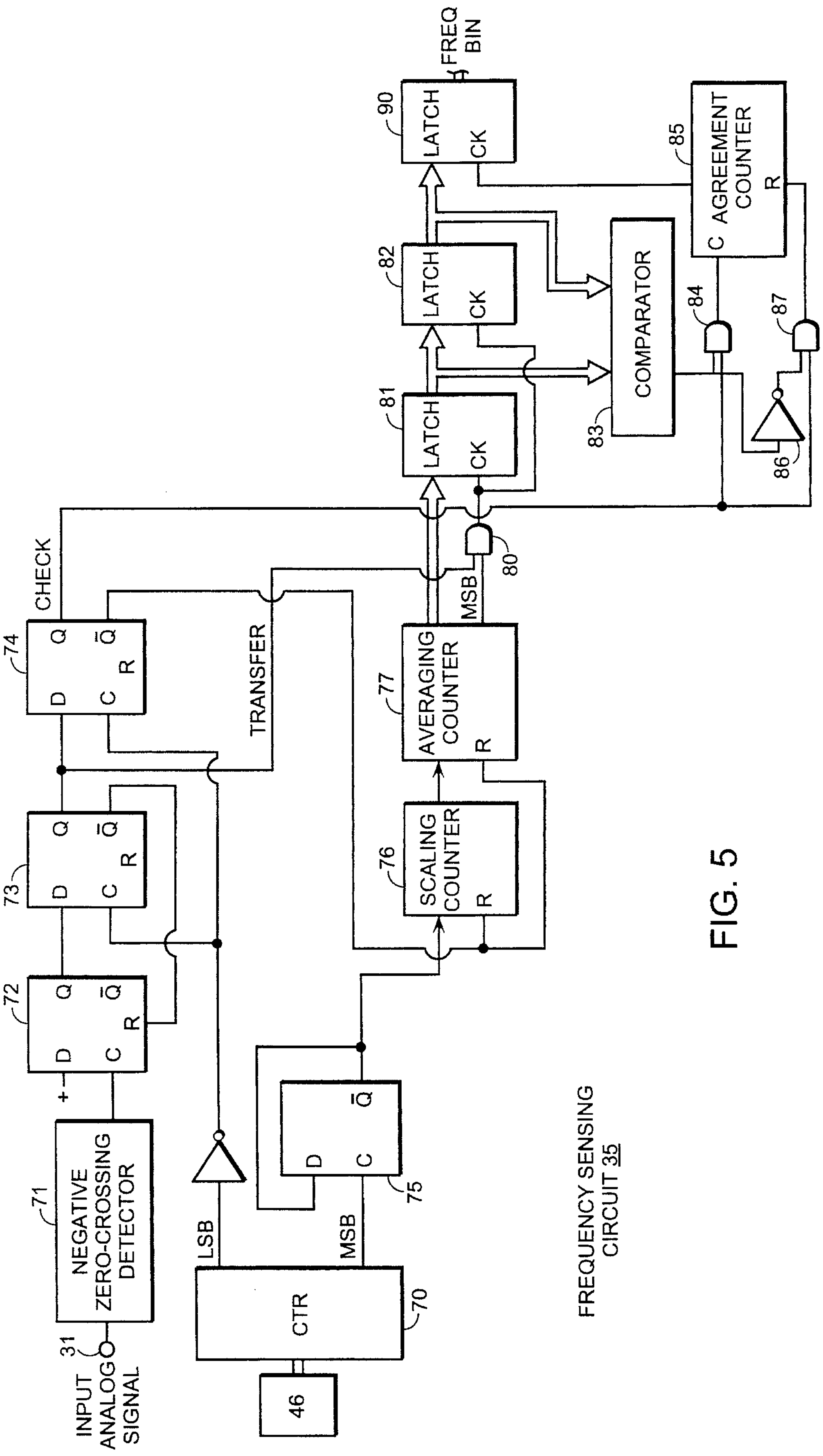
FIG. 5 is a diagram of frequency sensing circuitry used in the circuitry of FIG. 3.
Figure 6:
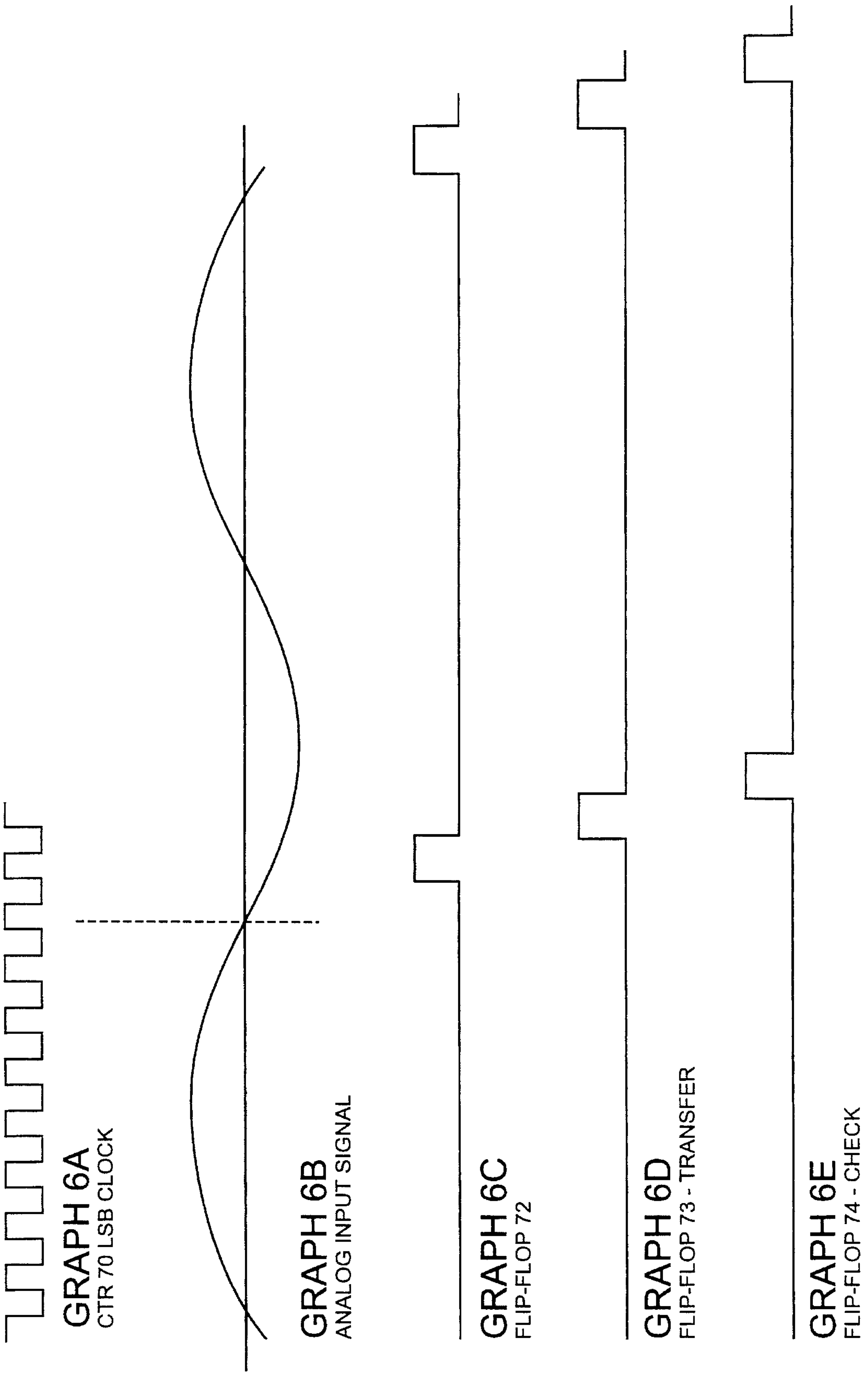
FIG. 6 is a timing diagram useful in understanding the operation of the circuitry in FIG. 5.

The remaining circuitry in FIG. 3, and disclosed in more detail in FIGS. 5 and 6, compensates the signal so that the beamwidth is relatively constant over a significant frequency range by generating a frequency dependent control signal that in real time selects an appropriate level of amplitude shading for the signal being sent to each transducer. Specifically, the frequency sensing circuit 35 in FIG. 3 analyzes the incoming analog signal at the input terminal 31 on a real time basis to assign the frequency at each sample and at each unit delay into one of a predetermined number of frequency bins designated by the FREQ BIN signals. These signals are applied to the beamforming delay control 54 and to an amplitude shading control 60 in the modification circuit 37. As previously indicated, the beamforming delay control 54 includes a set of delay values for each projector and for each beam direction. Each of these sets can then be duplicated for each of the frequency bins that frequency sensing circuit 35 defines. The amplitude shading control circuit 60 includes, for each projector and for each frequency bin, a shading value that can be obtained either by a simulation or experience. Thus as the PROJ ID signals identify each of the projector drivers in sequence, the amplitude shading control 60 applies a corresponding value to a multiplier circuit 61 thereby to further compensate the amplitude of the signal that will be generated by the corresponding ones of the projector drivers 40.

FIG. 5 depicts one embodiment of a frequency sensing circuit 35 that is capable of providing frequency analysis of the incoming analog signal at the input terminal 31. It receives the input analog signal from the terminal 31 and the clocking signals from the clock oscillator 46. A counter 70, the function of which may be provided by the clock divider 47, produces clocking signals identified as LSB and MSB. GRAPH 6A depicts the LSB signal. In one embodiment, the LSB signal operates as the clocking frequency while the MSB produces a slower clocking signal at one-eighth the clock frequency.

A negative zero-crossing detector 71, that is well known in the art, produces a positive going clocking signal each time the analog signal, shown in GRAPH 6B, crosses the zero value in a negative direction. This sets a flip-flop 72, as shown in GRAPH 6C such that a next positive going edge of an inverted LSB signal clocks and sets a flip-flop 73 as shown in GRAPH 6D. The flip-flops 73 and 72 are interconnected so that the flip-flop 72 resets as shown in GRAPH 6C of FIG. 6. The next clocking pulse then sets the flip-flop 74 as shown in GRAPH 6E and resets the flip-flop 73 thereby to produce a TRANSFER pulse as shown in GRAPH 6D. The following pulse then resets the flip-flop 74 to complete a CHECK signal as shown in GRAPH 6E. Consequently with the clock running at a frequency as shown in GRAPH 6A each negative going crossing of the analog signal shown in GRAPH 6B triggers the generation of the TRANSFER and CHECK pulses in succession. The inverted CHECK pulse resets and initializes counters 76 and 77 at the start of each signal period.

In the intervals between these pulse sequences, the counter 70 and a flip-flop 75 that acts as one stage of a multi-bit scaling counter 76, changes the value in the counter 75 so long as the flip-flop 74 is reset. The scaling counter 76 counts at a reduced rate (i.e., at one-sixteenth the clock rate) and is phased to provide appropriate gating signals. The output of the scaling counter 76 transfers into an averaging counter 77 that indicates whether the incoming signal has a frequency within an acceptable range. If the frequency is within an acceptable range, the averaging counter 77 also identifies the appropriate frequency bin. More specifically the averaging counter 77 is selected with a counting modulus that asserts the MSB signal if the incoming frequency is within the range. If the MSB signal is asserted, the less significant bits identify the frequency bin. For example, if the averaging counter 77 has four bit positions, the most significant bit will indicate whether the incoming signal is in the range and the remaining three bits will identify one of eight frequency bins.

Still referring to FIG. 5, when the flip-flop 73 produces the transfer pulse, a gate 80, if enabled from an MSB signal from the averaging counter 77 indicating the signal is within the frequency range, enables the circuit 35 to latch the output of the averaging counter 77 into a latch 81 and to transfer the output of the latch 81 to a latch 82 so the latches 81 and 82 contain representations for the frequency bins assigned in response to a pair of successive negative zero crossings of the analog signal. A comparator 83 compares the outputs of the latches 81 and 82. If a comparison exists indicating no frequency change within the resolution of the frequency bins, the succeeding check pulse energizes a gate 84 and advances a counter 85. If the values stored in the latches 81 and 82 are not identical, an inverter 86 and gate 87 respond to the CHECK pulse and reset the counter 85. When a predetermined number of comparisons are obtained in sequence, (e.g., four successive comparisons) the counter 85 clocks a latch 90 to receive the output of the latch 82. The latch 90 generates the FREQ BIN signals.

If the incoming frequency lies outside the frequency range defined by the predetermined frequency bins, the MSB signal from the averaging counter 77 will not be asserted so it will not enable a transfer into the latch 81 and the counter 85 will reset so that the output from the latch 90 can not change. If, however, the frequency is changing within the predetermined range, the counter 85 and related circuitry introduce hysteresis into the analysis of the signal so that the FREQ BIN signals do not change unless the predetermined number of counts have been accumulated over some interval where the frequency remains unchanged.

FIG. 5 shows the FREQUENCY SENSING circuit that includes flip flops 72, 73 and 74 that sense the zero crossing time of the signal, and generate a clocked pulse sequence as shown in FIG. 6. Returning to FIG. 5, a crystal controlled clock rate 46 and number of following binary counting stages are chosen to fit the desired frequency range covered by the input analog signal. The example circuit uses a four-bit counter 77, with the three LS (Least Significant) bits used to select the FREQ BIN after the latching process is complete. The MSB (Most Significant Bit) from the counter 77 must be high if the signal frequency is within the acceptable frequency octave. If the signal period is too short, the MSB signal will remain low and the TRANSFER pulse will be blocked at gate 80. Blocking also occurs if the signal period is too long because the MSB signal will go low before the TRANSFER pulse occurs. If the signal frequency is within an acceptable range, the three-bit data is latched into latch 81 on the rise of CK. If the averaging counter 77 produces the same count after the next signal period, the count is accepted by the latch 81 and the previous count moves into the latch 82. If the data latched by latches 81 and 82 is different, the Comparator 83 resets the Agreement Counter 85. If the data values stored are identical, then the Agreement Counter 85 increments. Only after the desired number of agreements have been accumulated is the latch 90 updated to select a new FREQ BIN. The hysteresis generated by the latching operations prevent noisy switching of the FREQ BIN address.

Therefore it will be apparent from the foregoing description that in operation an analog signal is applied to the input terminal 31 and the beam direction signals are applied to the input terminal 32. The circuitry in FIG. 3, using information contained in the beamforming delay control 54 and amplitude shading control 60, determines, for each of the projectors 11, a specific time delay and amplitude for producing an output beam pattern having a constant beam width even as the radiated angle and the frequency of the analog signal vary. It will also be apparent, that in certain situations the circuitry can be implemented using only the circuitry corresponding to the delay storage circuit 36 or to the modification circuit 37.

It will also be apparent that the transmitter 30 shown in FIG. 3 can be used to steer a beam in elevation or in both azimuth and elevation. For example, the same sixteen projectors 11 shown in FIG. 3 could be arranged in a 4×4 matrix or a 2×8 matrix and the values in the various memories changed so the beam could be steered in both azimuth and elevation.

This invention has been disclosed in terms of certain embodiments. It will be apparent that the foregoing and many other modifications can be made to the disclosed apparatus without departing from the invention. For example, FIG. 3 depicts hardware circuits, such as the frequency sensing circuit 35, the summary circuit 55 and the multiplex circuit 61. Any or all of the functions of these and other circuits can be embodied in hardware, software or both. Such substitutions of hardware and software are well known in the art. Therefore, it is the intent of the appended claims to cover all such variations and modifications as come within the true spirit and scope of this invention.

What is claimed is:

1. A transmitter for generating, from an array of individual acoustic projectors, an acoustic field at a frequency and along an azimuth determined, respectively, by a variable frequency analog control signal and a beam direction control signal, said transmitter comprising:

timing means for establishing a sampling interval;

analog signal storage means for accumulating, during each sampling interval, a value for the analog control signal;

frequency sensing means connected to said timing means for establishing a correspondence between the frequency of the analog control signal and one of a set of frequency ranges;

delay storage means connected to said frequency sensing means and said timing means for responding to the beam direction control signal by identifying, for each acoustic projector in the array, a stored value in the analog signal storage means; and driver means connected to said timing means and responsive to each selected value from said analog signal storage means for generating, for each acoustic projector in the array, an analog output signal whereby at least one of the analog output signals is delayed with respect to another of the analog output signals.

2. A transmitter as recited in claim 1 wherein said timing means comprises:

a clock oscillator; and a clock divider for generating a plurality of signals including a sampling signal designating each sampling interval, projector identification signals that identify each acoustic projector in sequence and a sequence of unit delay identification signals.

3. A transmitter as recited in claim 2 wherein said analog signal storage means comprises:

a circulating memory with data input and data output connections and with write address and read address connections; and an analog-to-digital converter for digitizing, during each sampling interval, the analog control signal for storage in said circulating memory through said data input connection at locations defined by the unit delay identification signals applied to the write address connection.

4. A transmitter as recited in claim 3 wherein said delay storage means comprises:

a beamforming delay control for storing, for each combination of an acoustic projector, beam direction and frequency range, an address offset value corresponding to the delays to be used in generating signals for said driver means; and means responsive to the unit delay identification signals and a delay value selected from said beamforming delay control for generating an address for said read address connection thereby to retrieve from said circulating memory a stored value for transfer to said driver means.

5. A transmitter as recited in claim 4 wherein said driver means comprises, for each acoustic projector:

digital-to-analog converter means for converting the retrieved stored value to an analog signal; and low pass filter means for conveying the output from said digital-to-analog converter to the corresponding acoustic projector.

6. A transmitter as recited in claim 5 wherein:

said timing means additionally comprises an output sequencer responsive to the projector identification signals; and said driver means additionally includes, for each acoustic projector, input latch means responsive to said output sequencer for controlling the transfer of the retrieved stored value to said corresponding digital-to-analog converter means.

7. A transmitter as recited in claim 4 additionally comprising modification means interposed between said analog signal storage means data output connection and said driver means for modifying the selected value from said analog signal storage means as a function of the frequency range determined by said frequency sensing means.

8. A transmitter as recited in claim 7 wherein said frequency sensing means comprises:

a detector for generating a zero-crossing output signal on each corresponding zero crossing of the analog control signal;

counting means for accumulating a count corresponding to the interval between successive zero-crossing output signals; and frequency range identification means connected to said counting means for identifying the frequency range as a function of the count accumulated in said counting means.

9. A transmitter as recited in claim 8 wherein said frequency range identification means comprises:

first, second and third latch means connected in series for receiving at said first latch means the output from said frequency range identification means;

timing means for controlling the transfer of frequency identification signals seriatim through said latch means;

comparator means for comparing, after each zero-crossing signal, the contents of said first and second latch means; and comparison counting means connected to said comparator means for enabling the transfer of said second latch means to said third latch means after a predetermined number of comparisons thereby to provide information to said delay storage means and said modification means.

10. A transmitter as recited in claim 9 wherein said modification means comprises:

multiplying means having a first input connected to said circulating memory data output connection, a second input and an output connected to said driver means; and amplitude shading control means for storing a modification value for each combination of an acoustic projector and frequency range, said amplitude shading control having a first input connected to said timing means for receiving the projection identification signals, a second input connected to said third latch means and an output connected to said second input of said digital multiplying means for conveying a selected value from said amplitude shading control means to said multiplying means.

11. A transmitter as recited in claim 2 additionally comprising modification means interposed between said analog signal storage means data output connection and said driver means for modifying the selected value from said analog signal storage means as a function of the frequency range determined by said frequency sensing means.

12. A transmitter as recited in claim 11 wherein said frequency sensing means comprises:

a detector for generating a zero-crossing output signal on each corresponding zero crossing of the analog control signal;

counting means for accumulating a count corresponding to the interval between successive zero-crossing output signals; and frequency range identification means connected to said counting means for identifying the frequency range as a function of the count accumulated in said counting means.

13. A transmitter as recited in claim 12 wherein said frequency range identification means comprises:

first, second and third latch means connected in series for receiving at said first latch means the output from said frequency range identification means;

timing means for controlling the transfer of frequency identification signals seriatim through said latch means;

comparator means for comparing, after each zero-crossing signal, the contents of said first and second latch means; and comparison counting means connected to said comparator means for enabling the transfer of said second latch means to said third latch means after a predetermined number of comparisons thereby to provide information to said delay storage means and said modification means.

14. A transmitter as recited in claim 13 wherein said modification means comprises:

multiplying means having a first input connected to said circulating memory data output connection, a second input and an output connected to said driver means; and amplitude shading control means for storing a modification value for each combination of an acoustic projector and frequency range, said amplitude shading control having a first input connected to said timing means for receiving the projection identification signals, a second input connected to said third latch means and an output connected to said second input of said digital multiplying means for conveying a selected value from said amplitude shading control means to said multiplying means.

15. A transmitter for driving an array of individual acoustic projectors at a frequency and direction determined, respectively, by a variable frequency analog control signal and a beam direction control signal, said transmitter comprising:

timing means for establishing a sampling interval;

analog signal storage means for accumulating, during each sampling interval, a value for the analog control signal;

delay storage means connected to said timing means for responding to the beam direction control signal for producing, for each acoustic projector in the array, a time delayed analog control signal for that acoustic projector; and driver means connected to said timing means and said delay storage means for generating, for each acoustic projector in the array, an analog output signal.

16. A transmitter as recited in claim 15 wherein said timing means comprises:

a clock oscillator; and a clock divider for generating a plurality of signals including a sampling signal designating each sampling interval, projector identification signals that identify each acoustic projector in sequence and a sequence of unit delay identification signals.

17. A transmitter as recited in claim 16 wherein said analog signal storage means comprises:

a circulating memory with data input and data output connections and with write address and read address connections; and an analog-to-digital converter for digitizing, during each sampling interval, the analog control signal for storage in said circulating memory through said data input connection at locations defined by the unit delay identification signals applied to the write address connection.

18. A transmitter as recited in claim 17 wherein said delay storage means comprises:

a beamforming delay control for storing, for each combination of an acoustic projector, beam direction and frequency range, an address offset value corresponding to the delays to be used in generating signals for said driver means; and means responsive to the unit delay identification signals and a delay value selected from said beamforming delay control for generating an address for said read address connection thereby to retrieve from said circulating memory a stored value for transfer to said driver means.

19. A transmitter as recited in claim 18 wherein said driver means comprises, for each acoustic projector:

digital-to-analog converter means for converting the retrieved stored value to an analog signal; and low pass filter means for conveying the output from said digital-to-analog converter to the corresponding acoustic projector.

20. A transmitter as recited in claim 19 wherein:

said timing means additionally comprises an output sequencer responsive to the projector identification signals; and said driver means additionally includes, for each acoustic projector, input latch means responsive to said output sequencer for controlling the transfer of the retrieved stored value to said corresponding digital-to-analog converter means.

21. A transmitter for driving an array of individual acoustic projectors at a frequency and direction determined, respectively, by a variable frequency analog control signal and a beam direction control signal, said transmitter comprising:

timing means for establishing a sampling interval and unit delay signals;

analog signal storage means for accumulating, during each sampling interval, a value for the analog control signal;

frequency sensing means connected to said timing means for establishing a correspondence between the frequency of the analog control signal and one of a set of frequency ranges;

delay storage means connected to said frequency sensing means and said timing means for identifying for each acoustic projector in the array one of the stored values in said analog signal storage means;

means connected to said timing means and said delay storage means for retrieving a selected value in response to the beam direction control signal and the unit delay signals;

signal modifying means connected to said timing means and said frequency sensing means for modifying the selected value from said analog signal storage means whereby the modified value depends upon the frequency range; and driver means connected to said timing means and said signal modifying means for generating, for each acoustic projector in the array, an analog output signal.

22. A transmitter as recited in claim 21 wherein said frequency sensing means comprises:

a detector for generating a zero-crossing output signal on each corresponding zero crossing of the analog control signal;

counting means for accumulating a count corresponding to the interval between successive zero-crossing output signals; and frequency range identification means connected to said counting means for identifying the frequency range as a function of the count accumulated in said counting means.

23. A transmitter as recited in claim 22 wherein said frequency range identification means comprises:

first, second and third latch means connected in series for receiving at said first latch means the output from said frequency range identification means;

timing means for controlling the transfer of frequency identification signals seriatim through said latch means;

comparator means for comparing, after each zero-crossing signal, the contents of said first and second latch means; and comparison counting means connected to said comparator means for enabling the transfer of said second latch means to said third latch means after a predetermined number of comparisons thereby to provide information to said delay storage means and said modification means.

24. A transmitter as recited in claim 23 wherein said modification means comprises:

multiplying means having a first input connected to said circulating memory data output connection, a second input and an output connected to said driver means; and amplitude shading control means for storing a modification value for each combination of an acoustic projector and frequency range, said amplitude shading control having a first input connected to said timing means for receiving the projection identification signals, a second input connected to said third latch means and an output connected to said second input of said digital multiplying means for conveying a selected value from said amplitude shading control means to said multiplying means.

* * * * *